United States Patent [19]
Rose et al.

[11] Patent Number: 5,260,565
[45] Date of Patent: Nov. 9, 1993

[54] SEPARATION OF SIMULTANEOUS EVENTS IN A LASER FIRING UNIT USING A POLARIZATION TECHNIQUE

[75] Inventors: Dennis Rose, Claremont; Paul Sugino, Santa Maria; Ed Russell, Goleta, all of Calif.

[73] Assignee: Santa Barbara Research Center, Goleta, Calif.

[21] Appl. No.: 237,262

[22] Filed: Aug. 26, 1988

[51] Int. Cl.$^5$ .......................... H01J 5/16; H01J 40/14; G01N 21/00
[52] U.S. Cl. .............................. 250/227.15; 356/73.1; 250/227.17
[58] Field of Search ................... 250/227, 225, 227.15, 250/227.17; 356/73.1

[56] References Cited

U.S. PATENT DOCUMENTS 4,560,867 12/1985 Papuchon et al. ................... 250/225
4,564,289 1/1986 Spillman, Jr. ......................... 250/225
4,682,024 7/1987 Halldorsson et al. ............... 250/227

Primary Examiner—David C. Nelms
Assistant Examiner—William L. Oen
Attorney, Agent, or Firm—W. C. Schubert; W. K. Denson-Low

[57] ABSTRACT

An apparatus (10) and method for testing the continuity of two optical fibers (12, 14) nonsimultaneously utilizing a single optical path. Two test light beams from a dual hybrid laser (30) are collimated and directed down a single optical path time-sequentially. The two light beams are linearly polarized in orthogonal planes. A quarter wave plate (42) converts the linearly polarized light into circularly polarized light, and an optical sequencer (22) directs the circularly polarized beams to a plurality of desired optical paths, each path comprising one or two optical fibers (12, 14). A second quarter wave plate (50) converts the circularly polarized light back into linearly polarized light, and a polarizing beamsplitter (24) reflects one of the beams and transmits the other. The two beams then enter the optical fibers (12, 14), where they are reflected by dichroic mirrors (26, 28) at the opposite end of the fibers (12, 14). The reflected beams retrace the original optical paths until they are reflected by a beamsplitter (38) which directs the beams onto a photodetector (58). The intensity of the light pulse detected by the photodetector (58) will indicate the continuity of the fibers (12, 14). Using this invention, measurements of the continuity of the two fibers (12, 14) can be made separately, resulting in increased sensitivity over methods which measure the two fibers (12, 14) simultaneously.

24 Claims, 2 Drawing Sheets

SEPARATION OF SIMULTANEOUS EVENTS IN A LASER FIRING UNIT USING A POLARIZATION TECHNIQUE

This invention was made with government support under contract Number F04704-86-C-0165 awarded by the Department of the Air Force. The government has certain rights in this invention.

CROSS-REFERENCE TO RELATED APPLICATIONS

The invention described herein has subject matter which is related to the patent application entitled "Laser Initiated Ordnance System Optical Fiber Continuity Test", Ser. No. 087,366, by Richard Jacobs, which is assigned to the same assignee as the present invention.

BACKGROUND OF THE INVENTION

1. Field of the Invention

This invention relates to an apparatus and method for testing the continuity of optical fibers and, more particularly, to an apparatus and method for testing the continuity of two different optical fibers utilizing a single optical path.

2. Discussion

Optical fibers are used in a wide variety of applications. In most of these applications it is important to be able to test the continuity of the fiber. Optical fibers are often subject to stresses that can lead to breaks or misalignment of the fibers. This can result in a significant reduction in light throughput, which may cause failure of the particular system in which it is used. Consequently a number of methods of testing optical fibers have been developed. These include methods which simply introduce a light pulse at one end of the fiber and measure the optical throughput at the other end. In many systems, however, only one end of the optical fiber is accessible during testing, and a number of test systems capable of testing a fiber from a single end have been developed. These include systems utilizing optical time domain reflectometry. A system offering improved resolution over optical time domain reflectometry is described in related patent application Ser. No. 087,366, entitled "Laser Initiated Ordnance System Optical Fiber Continuity Test" by Richard Jacobs, and assigned to the same assignee as the present invention. That patent application discloses an optical fiber test system utilizing a dichroic surface mounted at the remote end of an optical fiber. The dichroic surface reflects light of the test wavelength and transmits the wavelength of the operable light signal. In that system, a test pulse is sent down the fiber and the amplitude of the light reflected by the dichroic surface indicates whether the fiber is defective or not.

Test systems utilizing dichroic reflectors are useful, for example, in laser initiated ordnance systems, also known as laser firing units. In laser firing units a primary laser is used to activate an explosive in a missile or other device. In one type of laser firing unit, stages in a missile may be fired by a high-energy laser pulse travelling through an optical fiber. Typically, a sequencer directs the light pulse to a series of individual or pairs of optical fibers.

Existing optical fiber continuity test systems are usually adequate when testing one fiber at a time. However, when an individual laser beam is transmitted down two fibers at a time to fire a pair of ordnance systems simultaneously, conventional test systems have been found to have some drawbacks. This is because, while such test systems can distinguish when both fibers are bad, the system is not always able to tell the difference between a return pulse from two good optical fibers and a return pulse from one good plus one bad optical fiber. This results from inherent limitations in the resolution of the detecting system. When the return pulse from a bad fiber is combined with the pulse from a good fiber, the amplitude of the return pulse is not always reduced sufficiently to permit detection of the bad fiber. This is especially true when the two fiber paths are unbalanced as is the case when there are different number of connectors in the two paths. Consequently, in systems where a single light beam is directed into two optical fibers simultaneously there has not been a satisfactory way to test the continuity of both fiber paths.

SUMMARY OF THE INVENTION

The present invention is directed to an apparatus and method for separating two time-sequential light beams travelling along a single optical path into two distinct optical paths. In accordance with the present invention, two test light beams, each linearly polarized in orthogonal planes, are first directed sequentially onto a common optical path. The light beams then pass through a quarter wave retardation plate which causes the linearly polarized light beams to become circularly polarized in opposite directions. The light beams then pass through a sequencer that directs them to a series of optical paths as the sequencer rotates about an axis. Each of these optical paths includes either one or two optical fibers. At the output of the sequencer, a second quarter wave plate converts the circularly polarized light beams back into light that is linearly polarized in orthogonal planes. The azimuths of these orthogonal planes are at $+45°$ and $-45°$ to the fast axis of the quarter wave plate. Circular polarization is used so that the azimuths of the orthogonal planes of the linearly polarized light can be selected for convenience by the appropriate orientation of the fast axis of the quarter wave plate.

After leaving the sequencer and the second quarter wave plate, the orthogonally linearly polarized light beams encounter a polarizing device. This polarizer transmits the light beam polarized in one plane to a first optical fiber. The polarizer also reflects light polarized in the orthogonal direction and the light so reflected enters a second optical fiber. Each optical fiber has a reflective surface on its opposite end that reflects light of the wavelength of the two beams. Upon reflection, the test beams retrace the original optical path back toward their source. A beamsplitter located in the optical path reflects a portion of the return light source and directs it onto a photodetector for measurement. In summary, when the first light source is turned on, a light pulse will be directed into the first optical fiber and the intensity of the return pulse will give an indication of the integrity of that optical fiber. Likewise, when the second light source is turned on, that light pulse will be directed into the second optical fiber and the return pulse will give an indication of the integrity of the second optical fiber.

The above test system can be used to test a number of additional pairs of fibers by rotating the sequencer so that it directs the two test light beams to other pairs of fibers. The present invention has the advantage of utilizing a single pre-existing optical path to test the continuity of two fibers time-sequentially. As a result, the difficulty of distinguishing a return pulse coming out of two good optical fibers from a return pulse coming out of one good and one bad fiber is avoided. The result is a simple and reliable method of testing the continuity of more than one optical fiber utilizing a single optical path.

BRIEF DESCRIPTION OF THE DRAWINGS

The various advantages of the present invention will become apparent to one skilled in the art by reading the following specification and by reference to the drawings in which:

FIG. 2 is a graph of typical transmittance curves of a polarizing beamsplitter used with the apparatus of the type illustrated in FIG. 1.

DESCRIPTION OF THE PREFERRED EMBODIMENT

Figure 1:
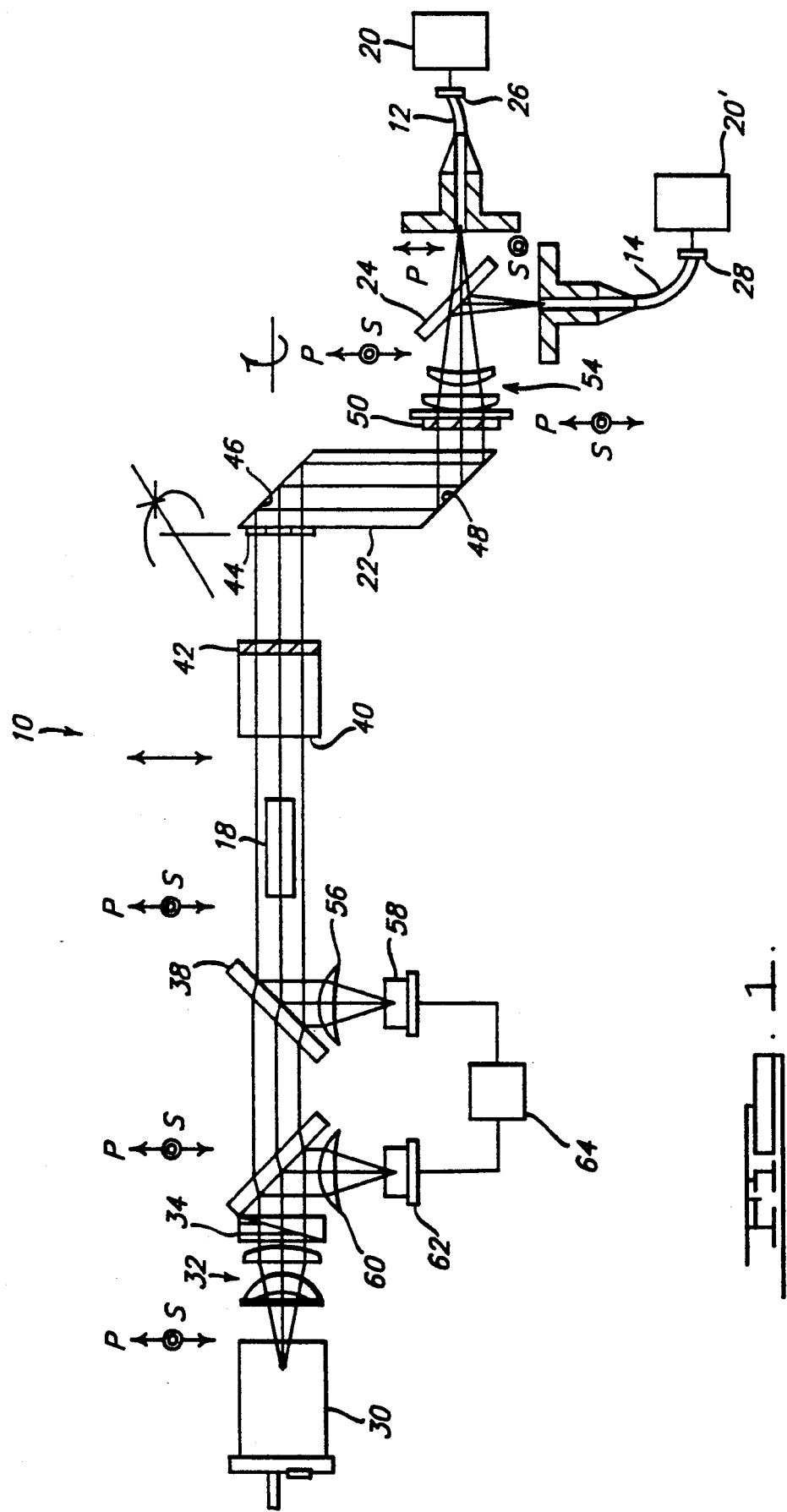
FIG. 1 is a schematic diagram of an apparatus for testing the continuity of optical fibers utilizing a polarization beam separation technique in accordance with the teachings of the present invention.
Figure 3:
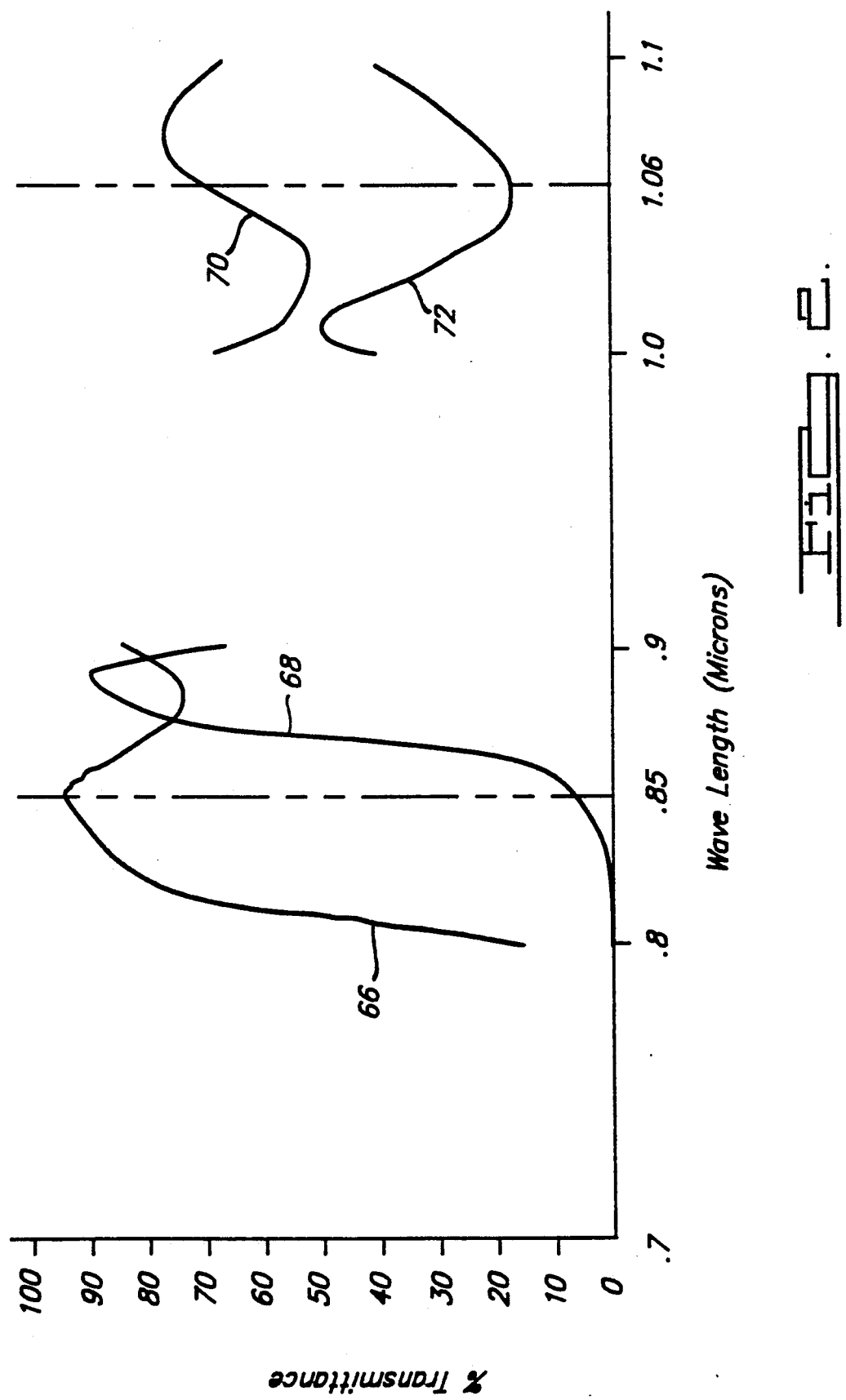

Turning now to FIG. 1, an apparatus 10 is provided for testing the continuity of optical fibers. In the preferred embodiment, the test apparatus 10 is part of a conventional laser firing unit. As in many conventional laser firing units, a high-energy laser 18 is transmitted to one or more detonators 20 which may be used to fire an explosive in a missile or other device. By using a rotating optical sequencer 22, many detonators 20 may be activated in succession by a single high-energy laser 18. For example, these detonators 20 may be activated to fire sequential stages in a missile.

The pulse from the high-energy laser 18 may be split by a beamsplitter 24 into two optical paths. These optical paths may comprise, for example, a first optical fiber 12 and a second optical fiber 14. In this way, a single pulse from the high-energy laser 18 may fire two detonators 20 and 20' simultaneously. In practice, at each sequential position of the rotating optical sequencer 22 there may either be a pair of optical fibers or only a single optical fiber. Where there is only a single optical fiber a beamsplitter 24 is not used.

Prior optical fiber continuity test systems could only test for continuity of the optical fibers 12 and 14 simultaneously, in the laser firing units. Because of the difficulty in distinguishing between a return pulse from two good optical fibers and a return pulse from one good optical fiber plus one defective optical fiber, the apparatus 10 in FIG. 1 utilizes two individual low-powered light beams to test the continuity of optical fibers 12, 14 separately. In accordance with the present invention, two separate light sources are provided by a dual hybrid laser 30. This laser 30 contains two separate laser diodes in a single package that emit two spatially separated and orthogonally linearly polarized beams of light. Each laser diode within the dual laser 30 emits a low-energy light beam. This beam may, for example, have an energy of 1 watt and a wavelength of 850 nanometers. While it is preferred to use a dual hybrid laser 30, it will be understood that other light sources may be used to produce the two orthogonally polarized light beams.

The two light beams emitted from the laser 30 are separated laterally by a small distance because the two lasers within dual laser 30 are spatially separated. One beam is polarized in the P direction and the other is polarized in the S direction as depicted symbolically in FIG. 1. The P direction, also known as the parallel plane, is defined as the plane which includes the optic axis of the beam and a line normal to the optical surface of the beamsplitter 36. The S plane is defined as the plane that is orthogonal to the P plane.

A lens system 32 is used to convert the flux from the two laser diodes in the dual hybrid laser 30 into two collimated but angularly separated beams. These two beams then enter a Wollaston prism 34. The Wollaston prism 34 is used to combine the two beams onto a common path. As will be appreciated, a Wollaston prism is a type of beamsplitting polarizer made of two different prism-shaped materials with their optic axis at 90° to each other. Normally, a Wollaston prism is used as a polarizer to convert a single unpolarized light beam into two angularly separated, but linearly polarized, light beams. In conventional use, when unpolarized light enters a Wollaston prism, it first encounters a material which has its optic axis parallel to the face of the prism that the unpolarized light is incident upon. The light then encounters a second material which has its optic axis at 90° to the axis of the first material in the Wollaston prism. As a result, the light is separated into two orthogonally linearly polarized beams which have angular separation between them.

In accordance with the present invention, the Wollaston prism 34 is used in reverse. Two light beams which are angularly separated by an angle theta and orthogonally linearly polarized, enter the Wollaston prism 34, designed to produce an angular deviation of theta, with the deviation plane of the Wollaston parallel to the deviation plane of the incident orthogonally polarized light beams. These beams are then converted into a single light beam inside the Wollaston prism 34 and a single beam leaves the Wollaston prism 34. It should be noted that a 180° rotation in azimuth of the Wollaston prism, i.e., rotation about the normal to entrance face, from the proper (beam combining orientation) will produce an angular separation of two times theta between the beams rather than zero angular separation. In accordance with the present invention, when the two beams are pulsed time-sequentially and exit the Wollaston prism, they are travelling along a single common path and retain their original linear polarization states. While the Wollaston prism 34 is preferred to combine the beams because of the simplicity and compactness of the arrangement, it will be appreciated that other beam combiners may be employed to combine the beams.

The combined beams then are transmitted through two beamsplitters 36, 38. While these beamsplitters 36, 38 will be discussed below, at this point it is important simply to note that approximately 90% of the light from the two beams is transmitted through the first beamsplitter 36 and approximately 50% of the light is transmitted through the second beamsplitter 38. The two beams are then directed to a conventional safety and arming rhomboid 40. While the details are not shown, it will be appreciated that the safety and arming rhomboid 40 operates in two modes. In the safety mode, light from the high-powered laser 18 is blocked so that it may not enter the optical path and reach the detonators 20. Continuity testing of the optical fibers 12, 14 is performed while the safety and arming rhomboid 40 is in the safety position. In this position, the two beams of light from the dual laser 30 are transmitted through the safety and arming rhomboid 40. In the arm mode, the safety and arming rhomboid 40 is moved out of the way and light from the high-energy laser 18 is thereby permitted to travel along the optical path toward the detonators 20.

In the safety mode, after the two light beams pass through the safety and arming rhomboid 40, they enter a quarter wave plate 42. As will be appreciated, a quarter wave plate is made out of a birefringent material which has a different refractive index for two orthogonal directions of linearly polarized light. As a result, one wavefront of the light will be ahead of another wavefront by a distance that depends on the thickness of the plate. In a quarter wave plate, this thickness is chosen so that the two wavefronts are separated by one quarter wavelength. In other words, their wave fronts are 90° out of phase. Thus, when linearly polarized light enters a quarter wave plate, it is converted into two wavefronts 90° out of phase, which is equivalent to circularly polarized light. The handedness of the circular polarization depends on the orientation of the fast axis of the quarter wave plate 42. In accordance with the present invention, the quarter wave plate 42 fast axis is oriented at 45° to the P polarization plane. As a result, the beam with P polarization is circularly polarized with one handedness and the beam with S polarization is circularly polarized with the opposite handedness. Consequently, the output of the quarter wave plate 42 consists of one beam which is right-circularly polarized and a second beam which is left-circularly polarized as depicted symbolically in FIG. 1. The purpose of converting the linearly polarized light into circular polarized light is that then the azimuth of the linearly polarized light can be selected for convenience by the orientation of the fast axis of the second quarter wave plate.

Before they enter the sequencer 22 the two beams enter a compensating retarder 44 which is positioned at the input of the sequencer 22. When light passes through the sequencer 22, it is reflected on two surfaces 46, 48. Reflections on these two surfaces 46, 48 will introduce phase shifts and hence a retardation. Such phase shifts can change a circularly polarized beam from circular to elliptical polarization. To avoid this, retarder plate 44 is used to compensate for these phase shifts. The retarder plate 44 is chosen with characteristics that depend on the material of the sequencer 22. For instance, by calculation, it can be determined that if the sequencer 22 is made of fused silica, the sequencer will introduce a retardation of 51° and compensating retarder plate 44 should have the same retardation of 51° but be oriented with the azimuth of the fast axis at 90° to the fast axis of the sequencer, rhomboid 22. (The retardation plate 44 is similar to the quarter wave plate 42, in that the quarter wave plate 42 introduces a retardation of 90° and the retarder plate 44 introduces a retardation of 51°.) Thus, the net effect on the polarization of light beams passing through the compensating retarder plate 44 and the sequencer rhomboid 22 is that of 0° retardation, i.e., such that the polarization characteristics of a light beam passing through the combination is unaltered.

Upon leaving sequencer 22, the light beams enter a second quarter wave plate 50. This quarter wave plate 50 acts to reverse the effect of first quarter wave plate 42, in that circularly polarized light enters quarter wave plate 50 and is transformed into linearly polarized light. Because the two circularly-polarized beams have opposite handedness, they will leave quarter wave plate 50 orthogonally linear polarized, thus restoring the linear polarization that the two beams had before they entered the first quarter wave plate 42.

Upon leaving the second quarter wave plate 50, the two orthogonally linearly polarized beams enter a lens system 54 which is used to focus the beams into the optical fibers 12, 14. Between the optical fibers 12, 14 and the lens system 54 is positioned a polarization beamsplitter 24. Polarization beamsplitter 24 has the property of separating the polarized beams so that the P component is predominantly transmitted and the S component is predominantly reflected. As shown, the P component is transmitted through polarization beamsplitter 24 and enters the first optical fiber 12, and the S component is reflected by the polarization beamsplitter 24 and enters the second optical fiber 14. Polarization beamsplitter 24 characteristics are chosen so that it reflects equal portions of the high-energy beam from high-energy laser 18. Because the light from the high-energy laser 18 is of a different wavelength than the light from dual laser 30, and is also unpolarized, this imposes certain requirements on the materials and design used for polarization beamsplitter 24. Polarization beamsplitter 24 must also be chosen so that it can survive the light from the high-energy laser 18 without incurring damage.

FIG. 2 depicts the transmission characteristics of a typical polarization beamsplitter 24, which has been developed for use with the present invention. The four curves in FIG. 2 represent the percent transmission for the two linear polarizations through the polarization beamsplitter 24 as a function of wavelength. The first curve 66 is a transmittance curve for a beam linearly polarized in the P direction. The second curve 68 is a transmittance curve for a beam linearly polarized in the S direction. Where the test wavelength of dual laser diode 30 is chosen to be 0.850 microns, 90% of the P polarized beam is transmitted and the rest, 10% is reflected. Likewise, only 5% of the S polarized beam is transmitted and the rest, 95% is reflected. (Absorption in the coating is negligible since any substantial absorption would lead to catastropic failure of the coating when exposed to the high energy laser beam.) Because 10% of the P beam is reflected into the second optical fiber 14, and 5% of the S beam is transmitted into the first optical fiber 12, it should be noted that this results in a leakage of the test beam into the optical fiber which is not being tested. It has been found that a leakage level of up to 10% can be tolerated without significantly altering the test results, which is a substantial improvement over the approximately equal transmission into each fiber with previous test methods.

One additional requirement of beamsplitter 24 is that it transmit and reflect about equal portions of the unpolarized light from the high energy laser 18. The 3rd and 4th curves in FIG. 2 indicate this result. On the 3rd curve 70 is the transmittance of a P polarized beam, and the 4th curves 72 is the transmittance of an S polarized beam at the wavelength of the high energy laser 18. This wavelength is 1.06 microns. Since unpolarized light can be considered to be a combination of equal portions of a P polarized beam and an S polarized beam, unpolarized light will have a transmittance midway between the curve for the P beam 70 and the curve for the S beam 72. Since this point is approximately at the 50% transmittance level, about 50% of the unpolarized beam will be transmitted and about 50% reflected.

The materials of the polarizing beamsplitter 24 should also be chosen so that they can withstand the light from the high energy laser 18 without damage. It should be noted that the polarization beamsplitter 24 in FIG. 1 and FIG. 2 is positioned at about 50° with respect to the optic axis of the incoming light beams. This angle is chosen because it is more nearly approaching Brewster's angle and permits the polarizing beamsplitter 24 to act more nearly as a perfect polarizer.

After entering and travelling through the first optical fiber 12, the P polarized beam is reflected by the first dichroic mirror 26. Likewise, when the S polarized beam enters the second optical fiber 14, it is reflected by the second dichroic mirror 28. The reflected beams leaving the optical fibers 12, 14 have become nearly depolarized (unpolarized) as they passed through the optical fibers 12, 14. The two beams retrace their initial paths until they encounter the second beamsplitter 38 which reflects about 50% of each beam into a lens 56. The light is then focused by lens 56 onto a photodetector 58. The photodetector 58 is preferably a high-speed photodiode which can respond to light pulses of the order of 20 nanoseconds in duration.

To conduct a continuity test using the fiber optic continuity test apparatus 10, the safe and arm rhomboid 40 is put in the test mode, and a light pulse is sent by the dual laser 30 that is linearly polarized in the P direction. This P pulse travels through the apparatus 10, through the polarization beamsplitter 24, into the first optical fiber 12 and is reflected by the first dichroic coating 26. The reflected pulse is unpolarized and passes back to the second beamsplitter 38 where approximately 50% of the light is reflected and is focused by lens 56 onto the photodetector 58. The amplitude of the return pulse will be indicative of the continuity of optical fiber 12. Subsequently, the dual laser 30 transmits a pulse of light polarized in the S direction. This S pulse will be reflected by the polarization beamsplitter 24 and will enter the optical fiber 14 where it will be reflected by the second dichroic mirror 28. Approximately 50% of the returning unpolarized beam will be reflected by beamsplitter 38 and focused by the lens 56 onto the photodetector 58. The amplitude of the return pulse will then be indicative of the continuity of optical fiber 14. In similar fashion, other pairs of optical fibers may be tested by rotating optical sequencer 22 about axis 52 to direct the test beams to other pairs of optical fibers.

To further increase the sensitivity of the optical fiber continuity test apparatus 10, a zero range detector is employed. The zero range detector comprises a beamsplitter 36, a focusing lens 60, an optical detector 62 and an electrical detector circuit 64. The beamsplitter 36 transmits about 90% of the light from the two beams emitted by dual laser 30 and reflects about 10% of this light. The reflected light is then focused by the lens 60 onto the photodetector 62. The photodetector 62 may be a high-speed photodetector, similar to the photodetector 58 used to detect return pulses. Photodiode 62 is coupled to photodiode 58 by means of electrical detector circuit 64. The zero range detector has two purposes. First, it is used to time-gate the return signal detected by the photodetector 58 so that unwanted light pulses due to reflections from optical elements in the system can be separated from the return signal originating from the optical fibers 12, 14. When light from the dual laser 30 is reflected by beamsplitter 36 and detected by photodector 62, the resulting electrical signal is used to trigger the detector circuit 64 to create a narrow window of time during which signals from photodetector 58 will be detected. In this way, the test apparatus 10 can ignore unwanted reflections from various points in the optical pathway which arrive earlier or later than would an expected return pulse from the dichroic mirrors 26, 28. The second purpose of the zero range detector is to normalize the return signal to eliminate the effect of pulse-to-pulse variations in the dual laser diode 30. It does this by integrating the signal received by photodiode 62 and using this signal to set a threshold in circuit 64 which will be used to distinguish good optical fibers from faulty optical fibers.

From the foregoing description, it can be appreciated that testing the continuity of a pair of optical fibers through a shared optical pathway has been made more accurate by way of this invention. The dual polarization separation technique permits each optical fiber to be tested separately, and accordingly, the ability to distinguish two good optical fibers from one good plus one bad optical fiber has been greatly improved. Further, the fiber optic continuity test apparatus 10 does not alter the path of the high-energy light output from the high-energy laser 18. Also, the use of circular polarization permits the system to test a number of pairs of optical fibers by rotation of the sequencer 22 without altering test beam polarization. Those skilled in the art can appreciate that other advantages can be obtained from the use of this invention and that modifications can be made without departing from the true spirit of the invention after studying the specification, drawings and following claims.

What is claimed is:

1. An apparatus for directing light from two sources sequentially through a single optical pathway to a plurality of optical pathways, said apparatus comprising:
   means for producing a first light beam that is linearly polarized in a first plane;
   means for producing a second light beam that is linearly polarized in a second plane, the second plane being orthogonal to the first plane;
   means for collimating the first and second light beams;
   means for directing the first and second light beams along a common path;
   first retarder means for transforming the polarization of the first and second light beams from linear to circular polarization;
   sequencer means disposed at the output side of the first retarder means for directing the first and second beams of light into a plurality of optical pathways;
   second retarder means located in at least one of the optical pathways for transforming the polarization of the first and second light beams from circular polarization back into orthogonal linear polarization; and
   polarizer means disposed at the output side of the second retarder means for selectively directing most of the light from one of the light beams in a first direction, and also for directing most of the light from the other light beam in a second direction.

2. The apparatus of claim 1 wherein the means for producing the first light beam is a first laser and the means for producing the second light beam is a second laser.

3. The apparatus of claim 2 wherein the first and second lasers are part of a dual hybrid laser.

4. The apparatus of claim 1 wherein the means for directing the first and second light beams along a common path is a Wollaston prism oriented so that the two beams of light enter the Wollaston prism angularly separated and leave the prism on a common path.

5. The apparatus of claim 1 wherein said first and second retardation means comprise quarter wave plates.

6. The apparatus of claim 1 wherein said sequencing means comprises:
first reflective surface positioned in the path of the first and second beams, at an angle with respect to the beams;
rotating means capable of rotating the sequencer about an axis passing through the center of the first reflective surface, the axis also being parallel and concentric with the path of the first and second beams of light; and
second reflective surface for receiving the light reflected by the first reflective surface, and also for directing light to the input side of the second retarder means, the second reflective surface being affixedly attached to the first reflective means so that it rotates about the axis together with the first reflective means.

7. The apparatus of claim 6 further comprising a third retarder means located in the path of the first and second beams for compensating the first and second beams of light for optical phase shifts introduced by reflections in the sequencer so that the net phase shift produced by both the third retarder means and the sequencer is approximately 0°.

8. The apparatus of claim 1 wherein said polarizer means is a polarizing beamsplitter that transmits approximately the same amount of light from one of the beams as it reflects from the other beam at a wavelength different from the wavelength of the first and second beams of light.

9. The apparatus of claim 1 further comprising:
a pair of optical fibers located in at least one of the optical pathways each optical fiber having one end for receiving the light output from said polarizing means, each optical fiber having at its opposite end a surface which substantially reflects light of the wavelength of the first and second light beams, thereby causing the light beams to travel back toward their respective sources;
a beamsplitter positioned in the path of the first and second light beams so that it reflects a portion of the light of the first and second beams after they have been reflected by the reflective surface at the ends of the optical fibers; and
photodetector means positioned to receive light reflected from the beamsplitter and capable of detecting the intensity of the light reflected out of the optical fibers, whereby the intensity of the light detected by the photodetector is indicative of the continuity of one of the optical fibers, when the first and second light beams are turned on individually.

10. The apparatus of claim 9 further comprising:
comparator means for comparing the intensity detected by the photodetector means with the minimum intensity expected for a defect-free optical fiber, whereby the existence of a defect in the optical fibers can be detected when the expected intensity is not exceeded.

11. The apparatus of claim 9 further comprising:
second beamsplitter positioned in the path of the first and second beams for reflecting a portion of the light from the two beams before the beams enter the optical fibers;
second photodetector means disposed to receive the light reflected by the second beamsplitter;
an electronic gating means coupled between the first photodetector means and the second photodetector means for triggering said first photodetector, so that only light that is reflected from a reflective surface on an optical fiber will be detected.

12. The apparatus of claim 11 further comprising a normalizing means coupled to the first and second photodetector means for setting and adjusting an electrical threshold used to determine whether one of said optical fibers has a defect, wherein variations in the light output of the first and second light sources are compensated for by adjustments in the threshold.

13. The apparatus of claim 9 further comprising:
laser for producing an unpolarized light beam having a different wavelength from said first and second light sources; and
means for directing the unpolarized beam from the laser along the same optical path as the first and second light beams, so that the unpolarized laser beam travels into both optical fibers.

14. The apparatus of claim 13 wherein the polarizing means reflects and transmits approximately equal portions of the light from the unpolarized laser and the reflective surfaces on the ends of the optical fibers transmits greater than 90% of the light of the wavelength of the unpolarized laser.

15. The apparatus of claim 1 wherein the polarizing means reflects approximately 90% or more of the light from one beam and transmits approximately 90% or more of the light from the other beam.

16. The apparatus of claim 14 further comprising a series of detonators for receiving light from the unpolarized laser after it is transmitted by the reflective surface on the ends of the optical fibers.

17. An apparatus for testing the continuity of at least two different optical fibers time-sequentially, said apparatus comprising:
a dual hybrid laser diode for producing first and second orthogonally linearly polarized beams of light that are angularly separated;
a first lens system for collimating the two light beams;
a Wollaston prism for directing the two collimated beams onto a common path;
a first quarter wave plate for transforming the polarization of the first and second light beams from linear to circular polarization;
sequencer means disposed at the output side of the first quarter waveplate for directing the first and second light beams into a plurality of optical pathways;
compensator means disposed at the input side of the sequencer means for introducing into the two beams of light an amount of optical phase shift equal and opposite to that introduced by the sequencer;
a second quarter wave plate for transforming the circularly polarized light back into linearly polarized light after it has passed through the sequencer;
a second lens system for focusing light from the second quarter wave plate;
a polarizing beamsplitter which primarily reflect light from the first light beam and primarily transmits light from the second beam, wherein light from one beam is transmitted in one direction and light from the other beam is reflected in a second direction;
at least one pair of optical fibers located in one of the optical pathways, comprising a first optical fiber with one end for receiving light from the first beam after it is transmitted by the polarizing beamsplitter and a second optical fiber with one end for receiving light from the second beam after it is reflected by the polarizing beamsplitter;

a first reflective surface located at the other end of the first optical fiber for reflecting light from the first beam;

a second reflective surface located at the other end of the second optical fiber for reflecting light from the second beam;

a beamsplitter for reflecting light after it is reflected out of the first and second optical fibers by said first and second reflective surfaces;

a photodetector for disposal to receive light from said beamsplitter for converting the energy of said reflected beam into an electrical signal; and a circuit means for determining whether the electrical signal is from a good or a defective optical fiber, whereby the intensity of the light detected by the photodetector will indicate the continuity of a single fiber at a time when the first and second light beams are turned on individually.

18. A method for directing light from two sources time-sequentially through a single optical pathway to a plurality of optical pathways, said method comprising the steps of:

providing a first light beam that is linearly polarized in a first plane;

providing a second light beam time-sequentially with the first beam that is linearly polarized in a second plane, the second plane being orthogonal to the first plane;

collimating the first and second light beams;

directing the first and second light beams along a common path;

transforming the polarization of the first and second light beams from linear to circular polarization;

directing the first and second beams of light into a plurality of optical pathways using a sequencer means;

transforming the polarization of the first and second light beams from circular polarization back into orthogonal linear polarization after the light beams have passed through the sequencer;

selectively directing light from one of said light beams in a first direction and directing light from the other of said light beams in a second direction after the light has been transformed back into linear polarization.

19. The method of claim 18 wherein the step of producing the first light beam utilizes a first laser and the step of producing a second light beam utilizes a second laser.

20. The method of claim 18 wherein the step of directing the first and second light beams along a common path utilizes a Wollaston prism oriented so that the two beams of light enter the Wollaston prism angularly separated and leave the prism on a common path.

21. The method of claim 18 wherein the step of transforming the polarization of the first and second light beams from linear to circular polarization utilizes quarter wave plates.

22. The method of claim 18 further comprising the step of compensating the two beams of light with a retarder means so that the net phase shift introduced by both the retarder means and the sequencer is approximately 0°.

23. The method of claim 18 further comprising the steps of:

providing a pair of optical fibers located in one of the optical pathways, with one end of one fiber positioned to receive light which has been directed in a first direction and one end of the other fiber disposed to receive light which has been directed in a second direction;

providing each optical fiber at its opposite end with a surface which reflects light of the wave length of the first and second light beams, thereby causing the light beams to travel back toward their respective sources;

providing a beamsplitter disposed in the path of the first and second light beams so that it reflects a portion of the first and second beams after they have been reflected by the reflective surfaces at the end of the optical fibers;

detecting the light reflected by the beamsplitter; and converting the detected light into an electrical signal, wherein the magnitude of the electrical signal is indicative of the continuity of one of the optical fibers when the beams are detected individually.

24. A method for testing the continuity of at least two different optical fibers time-sequentially, said method comprising:

providing time-sequentially first and second orthogonally linearly polarized beams of light that are angularly separated, using one or more lasers;

collimating the two beams of light with a first lens system;

directing the two collimated beams of light onto a common path using a Wollaston prism;

transforming the polarization of the first and second light beams from linear to circular polarization using a first quarter wave plate;

directing the first and second beams of light into a plurality of optical pathways with a sequencer means;

introducing phase shift into the beams which is equal and opposite to the phase shift introduced by the sequencer;

transforming the circularly polarized light beams back into linearly polarized light after it has passed through the sequencer using a second quarter wave plate;

focusing the light from the second quarter wave plate using a second lens system;

providing a polarization beamsplitter;

reflecting light polarized in one plane and transmitting light polarized in a second plane with the polarizing beamsplitter so that light from one beam is transmitted in one direction and light from the other beam is reflected in a second direction;

providing a pair of optical fibers located in one of said optical pathways comprising a first optical fiber with one end for receiving light transmitted by the polarizing beamsplitter and a second optical fiber with one end for receiving light reflected by the polarizing beamsplitter;

providing a first reflective surface located at the other end of the first optical fiber for reflecting light from one of the two beams;

providing a second reflective surface located at the other end of the second optical fiber for reflecting light from the other of the two beams;

providing a beamsplitter positioned in the path of the first and second light beams so that it reflects a portion of the first and second beams after they have been reflected by the first and second reflective surfaces;
detecting the light reflected by the beamsplitter; and
converting the light energy of the detected light into an electrical signal, whereby the magnitude of the electrical signal is indicative of the continuity of one of the optical fibers when the beams are detected individually.

* * * * *